United States Patent [19]

Noguchi et al.

[11] Patent Number: 4,982,492
[45] Date of Patent: Jan. 8, 1991

[54] METHOD OF INSTALLING GASKET INTO AUTOMOTIVE DOOR HANDLE

[75] Inventors: Hiroyuki Noguchi; Cort Springer, both of Marysville, Ohio

[73] Assignee: Honda Giken Kogyo Kabushiki Kaisha, Tokyo, Japan

[21] Appl. No.: 333,915

[22] Filed: Apr. 6, 1989

[51] Int. Cl.⁵ .......................................... B23P 19/04
[52] U.S. Cl. .......................................... 29/446
[58] Field of Search ............ 29/281.5, 283, 563, 29/568, 787, 788, 446, 818, 235, 445; 49/502; 53/447; 16/124; 279/1 A, 1 D, 1 DA, 1 ME, 2 R; 296/39.1, 152; 403/267; 414/331, 751; 901/31

[56] References Cited

U.S. PATENT DOCUMENTS 4,248,017 2/1981 Micallef ..................... 403/267 X
4,653,143 3/1987 Ketelhut et al. ................. 16/124
4,777,783 10/1988 Zald ............................... 53/447

Primary Examiner—Joseph M. Gorski
Assistant Examiner—Peter Dungba Vo

[57] ABSTRACT

A case gasket which is substantially rectangular in shape is installed on a flange of the handle case of a door handle to be attached to an outer surface of an automotive door panel in automatically assembling the door handle, the gasket having a shape corresponding to the shape of the flange of the handle case. First, one gasket is separated at a time from a vertically suspended stack of gaskets, and then the shape of the separated gasket is corrected by tensioning the gasket radially outwardly in engagement with the inner surface of four corners thereof. The gasket is mounted on the flange of the handle case while tensioning the gasket.

6 Claims, 16 Drawing Sheets

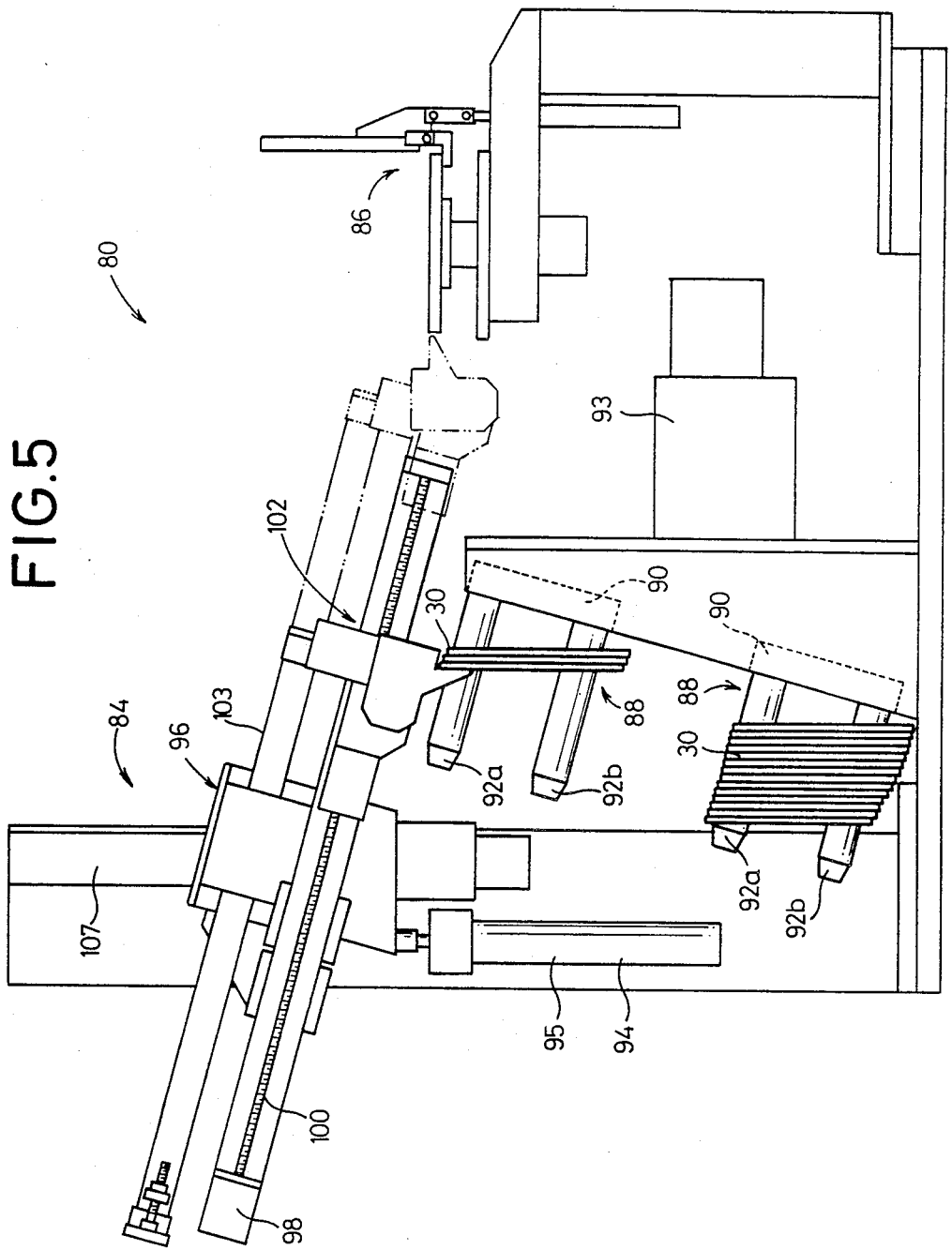

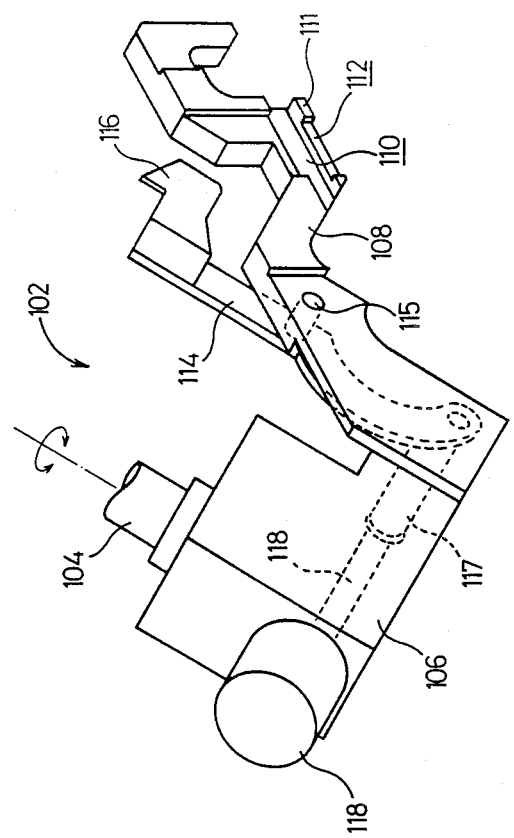

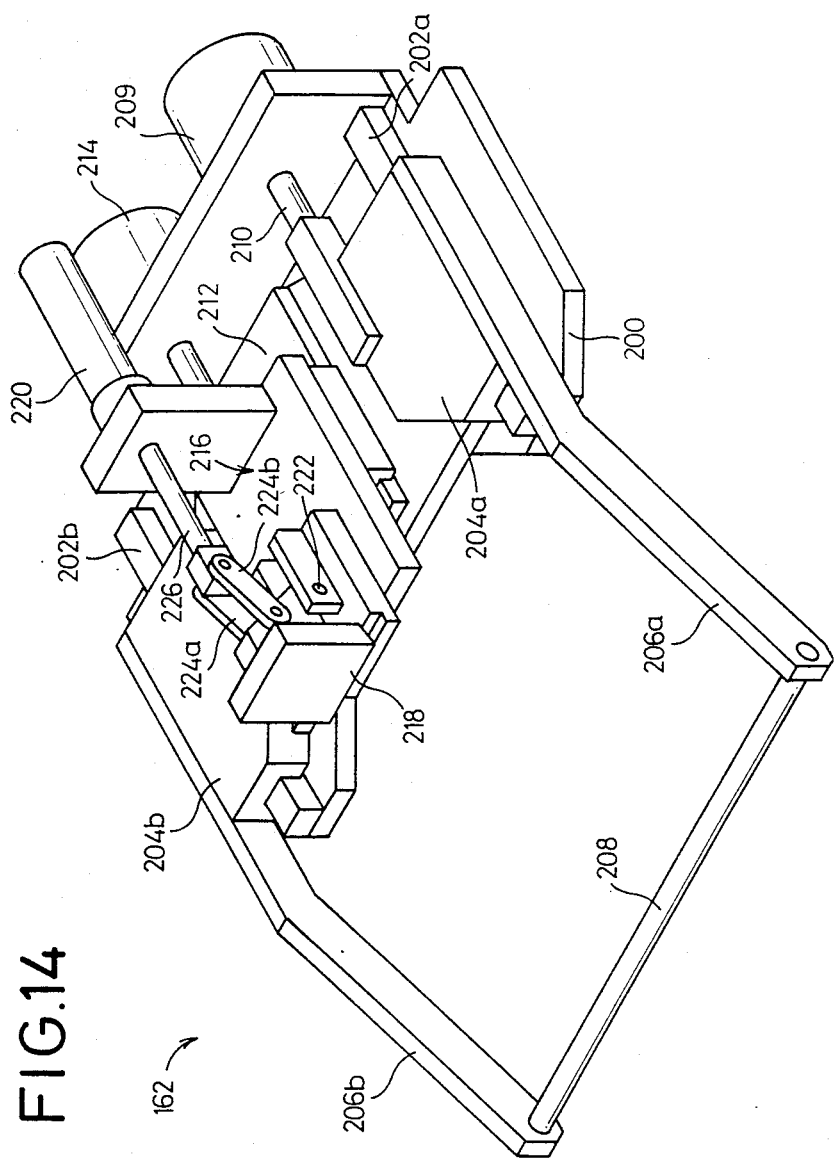

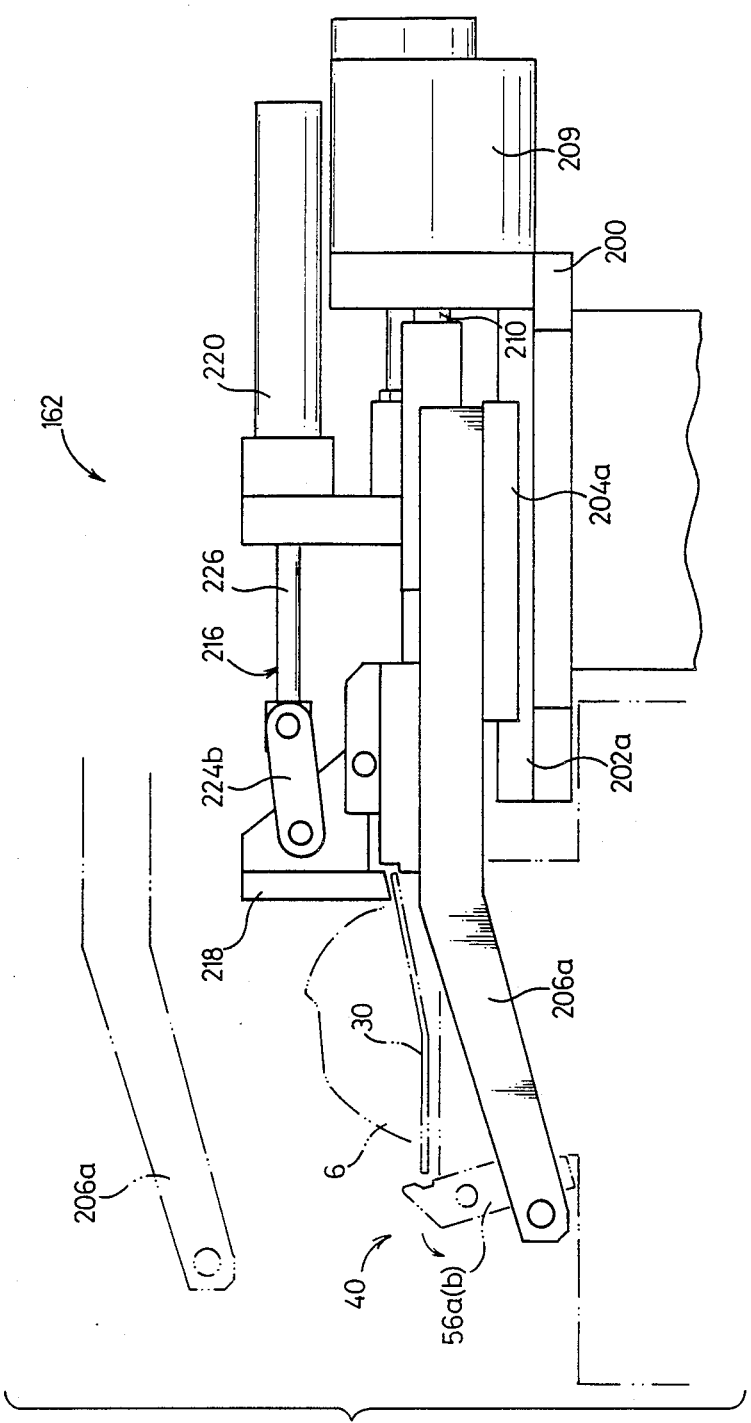

METHOD OF INSTALLING GASKET INTO AUTOMOTIVE DOOR HANDLE

BACKGROUND OF THE INVENTION

The present invention relates to a method of and an apparatus for supplying and installing a gasket, and more particularly to a method of and an apparatus for supplying and installing a case gasket on the handle case of a door handle fully automatically in a production system for assembling a door handle to be mounted on the outer surface of an automotive door panel, so that the door handle parts can be supplied and assembled efficiently.

When getting into an automobile, a door of the automobile is opened by gripping a door handle installed on the outer surface of the panel of the door. One known door handle for use on an automobile door is illustrated in FIGS. 1 and 2 of the accompanying drawings. FIG. 1 shows the various components of a door handle assembly 2, and FIG. 2 illustrates the door handle assembly 2 as it is completed.

The door handle assembly 2 basically comprises a handle case 4 and a handle 6, and also includes various other accessory parts. The handle 6 is angularly movably coupled to the handle case 4 by means of hinge pins 8a, 8b. More specifically, the handle 6 includes a hinge lever 10a connected to support arms 12a, 12b of the handle case 4 by the hinge pin 8a, and another hinge lever 10b connected to support arms 12c, 12d of the handle base 4 by the hinge pin 8b. Torsion coil springs 14a, 14b coact respectively between the support arm 12b and the hinge lever 10a and between the support arm 12c and the hinge lever 10b for normally holding the handle 6 against the handle case 4 when the handle 6 is assembled in the handle case 4. Stoppers 16 of rubber are mounted in the handle case 4 for preventing the handle 6 from directly hitting the handle case 4 to protect the handle case 4.

The handle case 4 has an integral protective member 18 projecting inwardly from the inner surface of a corner of the handle case 4. The protective member 18 serves to surround a lock in a door to protect the same when the door handle assembly 2 is installed on the door. A key guard assembly 20 is mounted in the protective member 18. The key guard assembly 20 comprises an annular gasket 22 and a gasket cap 24 by which the gasket 22 is fixed to the outer end of the protective member 18 and protected from damage. For attaching the key guard assembly 20, the gasket cap 24 and the gasket 22 are axially combined together into the key guard assembly 20, and then tongues 28a, 28b on the gasket cap 24 are inserted respectively into grooves 26a, 26b defined in the handle case 4 and bent over by staking into firm engagement with the handle case 4.

A case gasket 30 is interposed between the handle case 4 and a door panel 31 to provide a seal therebetween. The handle case 4 has a plurality of protrusions 32 on an outer peripheral flange thereof which are inserted into respective holes defined in the case gasket 30 and subsequently deformed by staking to hold the case gasket 30 in position. A bushing 34 is inserted in the hinge lever 10a and coupled to the mechanism of the lock in the door.

As described above, the door handle assembly 2 is comprised of the handle case 4, the handle 6, the hinge pins 8a, 8b, the coil springs 14a, 14b, and other small components. The door handle assembly 2 has been assembled only manually by workers through a complex process of various assembling steps. For putting the key guard assembly 20 into the handle case 4, for example, three assembling steps are required: First, the gasket 22 and the gasket cap 24 are combined into the key guard assembly 20. Then, the tongues 28a, 28b on the gasket cap 24 are inserted respectively into the grooves 26a, 26b in the handle case 4. Finally, the tongues 28a, 28b are bent radially inwardly by a staking tool to fasten the key guard assembly 20 to the handle case 4. Since the door handle assembly 2 itself is very small and its components are smaller and cannot be handled with ease, its assembling process does not end itself to an automatic process employing an industrial robot. It has been customary to assemble the door handle assembly manually by as many workers as required with jigs and tools designed for use in the various assembling steps.

To attach the case gasket 30 to the handle case 4, The case gasket 30 is mounted on the handle case 4 fixedly mounted on a jig with the protrusions 32 fitted in respective holes defined in the case gasket 30. The protrusions 32 are thereafter deformed or staked by a hand tool to fasten the case gasket 30 to the handle case 4. This assembling procedure is also not suitable for automatization because the case gasket 30 is soft and of irregular shapes including different thicknesses. Handling the case gasket 30 with a robot would, therefore, result in a different type of difficulty from the difficulty in handling the key guard assembly 20 with a robot.

At any rate, the manual assembling process is disadvantageous in that the assembling capability is limited and the efficiency depends on the skill of the worker who assembles the components. If the efficiency is to be increased according to the present manual method, the cost of skillful manual labor will also be increased, and so will the cost of manufacture as the personal expenses have a large share in the overall cost in these days. Therefore, there has been a strong demand in the art for a fully automatized process for assembling door handles.

SUMMARY OF THE INVENTION

It is a general object of the present invention to provide a method of and an apparatus for supplying and installing a case gasket on a handle case fully automatically without manual intervention through a substantially single process for higher assembling efficiency.

Another object of the present invention is to provide a method of installing a gasket on a flange of the handle case of a door handle to be attached to an outer surface of an automotive door panel in automatically assembling the door handle, the gasket having a shape corresponding to the shape of the flange of the handle case, said method comprising the steps of: separating one gasket at a time from a vertically suspended stack of gaskets; correcting the shape of the separated gasket by tensioning the gasket; and mounting said gasket on the flange of said handle case while tensioning the gasket.

Still another object of the present invention is to provide a method of installing the gasket on the flange of the handle case, wherein said gasket is substantially rectangular in shape.

Yet another object of the present invention is to provide a method of installing the gasket on the flange of the handle case, further including the step of delivering said vertically suspended stack of gaskets along a loop to a feeding means for separating gaskets one by one from the stack of gaskets.

Yet still another object of the present invention is to provide a method of installing the gasket on the flange of the handle case, further including the step of tensioning the gasket radially outwardly while vertically pressing the gasket across its plane.

A further object of the present invention is to provide a method of installing the gasket on the flange of the handle case, further including the step of tensioning the gasket in engagement with the inner surface of four corners of the gasket while vertically pressing the gasket across its plane.

A still further object of the present invention is to provide a method of installing the gasket on the flange of the handle case, further including the step of holding the gasket in engagement with protrusions on the flange of the handle case in mounting the gasket on said flange.

It is also an object of the present invention to provide an apparatus for installing a gasket on a flange of the handle case of a door handle to be attached to an outer surface of an automotive door panel in automatically assembling the door handle, the gasket having a shape corresponding to the shape of the flange of the handle case, said apparatus comprising: delivering means for moving a vertically suspended stack of gaskets to a predetermined position; feeding means for separating one gasket at a time from said stack of gaskets and gripping and feeding the separated gasket to a predetermined position; shape correcting means for pressing the fed gasket with a presser member while tensioning the gasket radially with a plurality of tensioning members to correct the shape of the gasket; an industrial robot having an end effector for holding the tensioned gasket on said shape correcting means; and an assisting jig for temporarily unclamping the handle case from a pallet and holding a portion of the gasket when the gasket is installed on the handle case.

Another object of the present invention is to provide an apparatus for installing the gasket on the flange of the handle case, wherein said delivering means includes a plurality of mobile bases arranged as a loop in a substantially vertical plane, each of said mobile bases having fixed bars for suspending the stack of gaskets, said mobile bases with the respective stacks of gaskets suspended on the bars being successively movable in one direction.

Still another object of the present invention is to provide an apparatus for installing the gasket on the flange of the handle case, wherein said feeding means comprises an actuator, a body vertically movable by said actuator, a ball screw threadedly extending through said body, and a gripping mechanism movable back and forth substantially horizontally on and along said ball screw by a motor.

Yet another object of the present invention is to provide an apparatus for installing the gasket on the flange of the handle case, wherein said gripping mechanism comprises a bracket coupled to a rotatable shaft connected to said motor, a gripping member fixed to said bracket and having a groove for receiving a gasket therein, a lever having on a distal end a separator for separating one gasket at a time from the stack of gaskets and gripping the separated gasket between the separator and said gripping member, said lever being angularly movably mounted on said gripping member, and an actuator for moving said lever toward and away from said gripping member.

Yet still another object of the present invention is to provide an apparatus for installing the gasket on the flange of the handle case, wherein said shape correcting means comprises a first plate, a plurality of substantially cylindrical tensioning members tiltably mounted on said first plate, a second plate disposed upwardly of said first plate, a presser member movable toward and away from said second plate by an actuator for gripping the gasket between the presser member and said second plate, and a plate slidable along tapered side surfaces of said tensioning members for tilting said tensioning members radially outwardly.

A further object of the present invention is to provide an apparatus for installing the gasket on the flange of the handle case, wherein said end effector comprises a plurality of openable and closable collet chucks positioned to hold the gasket tensioned on said shape correcting means, a cylinder for opening and closing said collet chucks, and a presser member movable by a cylinder for pressing the gasket held by said collet chucks against the flange of the handle case.

A still further object of the present invention is to provide an apparatus for installing the gasket on the flange of the handle case, wherein said assisting jig includes a vertically movable surface plate, a clamp release lever extending from said surface plate and movable back and forth by a first cylinder for engaging clamping members on said pallet, and a gasket holding mechanism movable back and forth on said surface plate by a second cylinder for pressing and holding the gasket against the flange of the handle case.

A yet further object of the present invention is to provide an apparatus for installing the gasket on the flange of the handle case, wherein said gasket holding mechanism comprises a cylinder, a swingable presser member, and a link operatively coupling said cylinder and said swingable presser member.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a side elevational view of a supply mechanism for supplying a case gasket to a handling robot;

FIG. 14 is a perspective view of an assisting jig of the case gasket applicator; and FIG. 15 is a side elevational view of the assisting jig.

DETAILED DESCRIPTION OF THE PREFERRED EMBODIMENT

Figure 1:
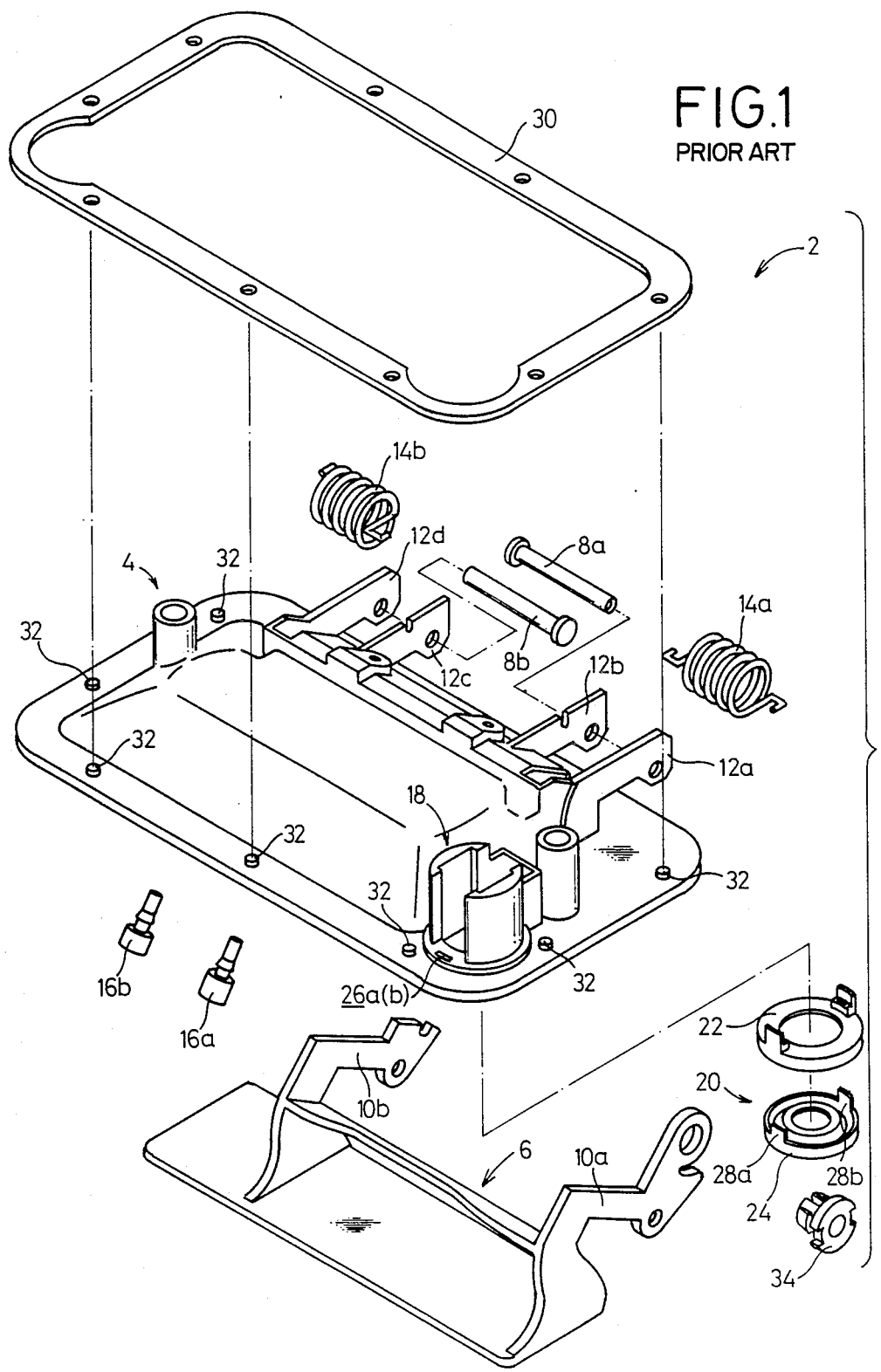
FIG. 1 is an exploded perspective view of a door handle into which a case gasket is incorporated by employing a gasket supplying and installing apparatus according to the present invention.
Figure 2:
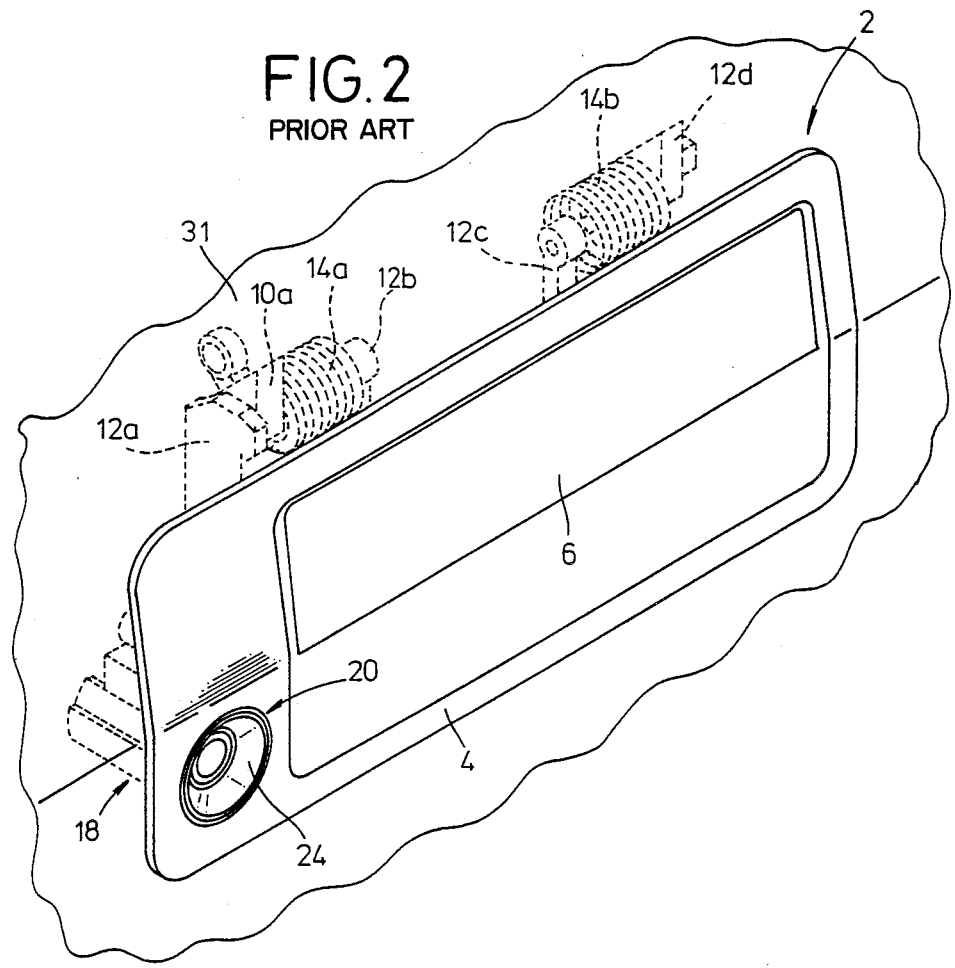
FIG. 2 is a perspective view of the completed door handle mounted on a door panel.

Prior to describing a method of and an apparatus for supplying and installing a case gasket according to the present invention, a pallet for feeding a workpiece to an assembling station will first be described below. The workpiece herein referred to is identical to the door handle assembly 2 shown in FIGS. 1 and 2, and the workpiece components are denoted by identical reference numerals employed in FIGS. 1 and 2, and will not be described in detail.

Figure 3:
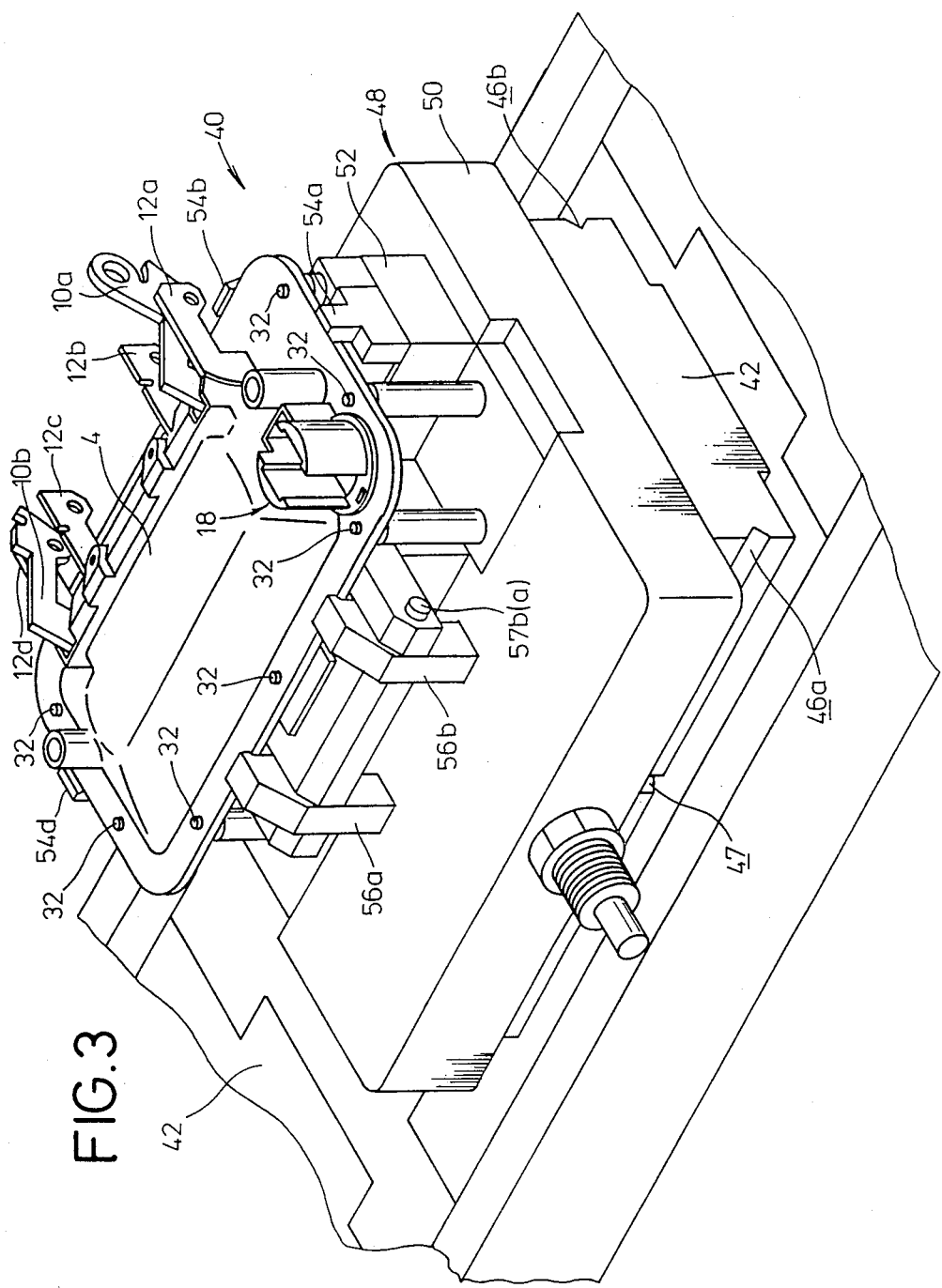
FIG. 3 is a perspective view of a pallet used for feeding the door handle.
Figure 4:
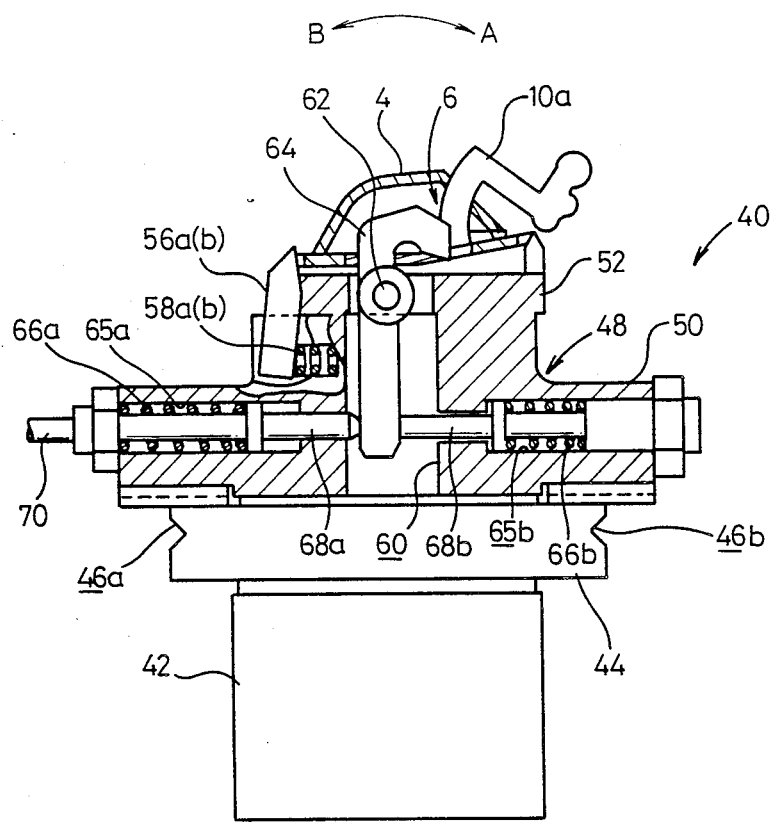
FIG. 4 is a cross-sectional view of the pallet.

FIG. 3 shows in perspective a handle case 4 and a handle 6 clamped as workpieces on a pallet 40. FIG. 4 illustrates a clamping mechanism mounted on the pallet 40 for fixing the handle 6 to the pallet 40. The pallet 40 is placed on a conveyor 42 which runs as a loop through all assembling steps at respective assembling stations (not shown), so that the pallet 40 can be delivered successively from one assembling station to another assembling station.

As shown in FIGS. 3 and 4, the pallet 40 includes a pallet base 44 having a pair of horizontal notches 46a, 46b defined in opposite sides thereof for receiving dog chucks (not shown) disposed in each of the assembling stations alongside of the conveyor 42 to stop the pallet 40 in position at each assembling position. One of the sides of the pallet base 44 has a vertical notch 47 defined therein across the horizontal notch 46a, for example. The pallet 40 can be positioned more accurately in each assembling station by engaging another dog chuck in the vertical notch 47.

A jig body 48 is fixedly mounted on the upper surface of the pallet base 44. The jig body 48 includes a first block 50 in the shape of a rectangular parallelepiped and a second block 52 disposed substantially centrally on the upper surface of the first block 50. Positioning members 54a through 54d are mounted on the upper surface of the second block 52 for engaging peripheral edges of the handle case 4 to position the handle case 4 against unwanted displacement. Two clamping members 56a, 56b for clamping the handle case 4 are disposed on one side of the second block 52. The clamping members 56a, 56b are angularly movably attached to the second block 52 by means of respective pins 57a, 57b. Compression coil springs 58a, 58b housed in the second block 52 engage the lower ends of the clamping members 56a, 56b, respectively, for normally urging the clamping members 56a, 56b resiliently to turn in a direction to cause upper fingers thereof to hold the handle case 4 down against the second block 52 (see FIG. 4).

As illustrated in FIG. 4, a vertically extending hole 60 is defined through the first and second blocks 50, 52, and a clamp lever 64 is disposed in the hole 60 and swingably supported by a pin 62. The first block 50 has a pair of horizontal holes 65a, 65b defined therein and communicating with the vertical hole 60, the holes 65a, 65b extending from the opposite sides of the first block 50 toward each other. Push rods 68a, 68b are disposed respectively in the holes 65a, 65b and have respective distal ends engaging the lower end of the clamp lever 64 in confronting relation under the resiliency of respective coil springs 66a, 66b disposed in the holes 65a, 65b around the push rods 68a, 78b. The coil spring 66b produces larger resilient forces than the coil spring 66a, so that the push rod 68b turns the clamp lever 64 about the pin 62 in the direction of the arrow A at all times against the bias of the coil spring 66a. Therefore, the handle 6 is held in position by a bent upper distal end of the clamp lever 64. A clamp release rod 70 engages the outer end of the push rod 68a. By bushing the clamp release rod 70, the clamp lever 74 is turned about the pin 62 in the direction of the arrow B to unclamp the handle 6.

The apparatus for supplying and installing a gasket according to the present invention will be described in detail below. The gasket supplying and installing apparatus operates to effect a continuous process comprising the first step of separating case gaskets, one by one, from a case gasket stack, the second step of correcting the shape of a separated case gasket 30 so as to allow the case gasket 30 to be easily set on a handle case, and the third step of enabling a handling robot to set the case gasket 30 on the handle case 4 through an assisting jig. The case gasket 30 in the illustrated embodiment is of a rectangular shape. However, a gasket which may be used in the present invention is not limited to the illustrated configuration as the shape of the gasket depends on the shape of the peripheral flange of the handle case 4 on which the gasket is to be installed.

FIG. 5 shows a case gasket supply mechanism 80 for carrying out the above first and second steps to effect various operations ranging from the supply of a case gasket 30 to the transfer of the case gasket 30 to a handling robot. The case gasket supply mechanism 80 comprises a gasket magazine unit 82 serving as a delivering means for delivering a stack of case gaskets 30 to a prescribed separating position, a pickup unit 84 as a feeding means for separating one case gasket 30, at a time, from the gasket stack which has been delivered by the gasket magazine unit 82 and for picking up the separated case gasket and feeding the same to a given position, and an aligner unit 86 for correcting the shape of the case gasket 30 which has been picked up by the pickup unit 84.

The gasket magazine unit 82 will first be described below. The gasket magazine unit 82 includes a plurality of magazine racks 88 arranged as a loop of mobile bases in a substantially vertical plane, and a drive mechanism for successively circulating the magazine unit 82. Each of the magazine racks 88 comprises a magazine disc 90 and two bars 92a, 92b fixed to the magazine disc 90. Several tens of case gaskets 30 are supported and hung on the bars 92a, 92b. The magazine racks 88 are successively circulated in one direction by the drive mechanism comprising a motor 93 while being kept at a constant angular position at all times by a parallel-link mechanism so that the case gaskets 30 are vertically suspended.

The pickup unit 84 is constructed as follows: The pickup unit 84 includes an upstanding frame 94 mounted on the floor and supporting a unit body 96 which is vertically movable by a cylinder 95 mounted on the frame 94. The unit body 96 is slightly tilted with respect to a horizontal plane and includes a ball screw 100 which is rotatable about its own axis by a motor 98. A gripping mechanism 102 for picking up case gaskets 30 one by one is threaded over the ball screw 100, and is movable along a guide bar 103 parallel to the ball screw 100 and slidably fitted through the unit body 96 by the ball screw 100 driven by the motor 93.

Figure 6B:
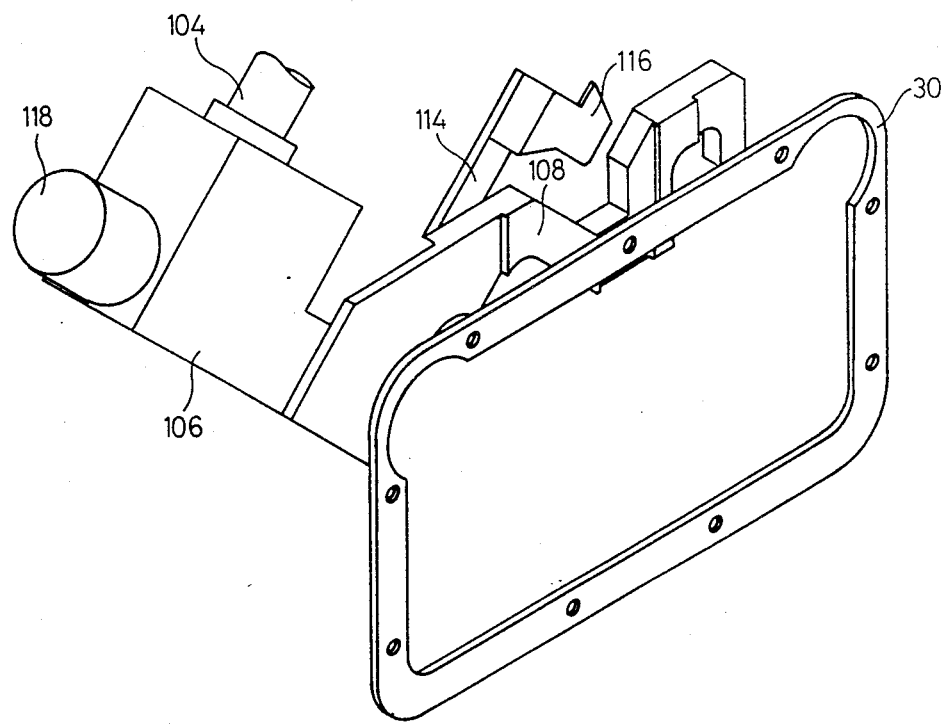
FIGS. 6(a) and 6(9) are perspective views of a gripping mechanism in a pickup unit.

The gripping mechanism 102 is illustrated in detail in FIGS. 6(a) and 6(b). A gripping member 108 especially designed for gripping a case gasket 30 is fixed to a bracket 106 mounted on a rotatable shaft 104 coupled to a motor (not shown). The gripping member 108 has a slot 110 defined therein for engaging a case gasket 30, and a groove 112 defined in a stepped portion 111 lying along the slot 110 for receiving the distal end of a separator (described below). A lever 114 is swingably supported on the gripping member 108 by means of a pin 115, and a separator 116 is attached to the distal end of the lever 114. The separator 116 has a thin distal end for easily separating the stacked case gaskets 30 one by one. The other end of the lever 114 is operatively coupled via a link 117 to a piston rod 118a extending from a cylinder 118 serving as an opening/closing drive source.

Figure 7:
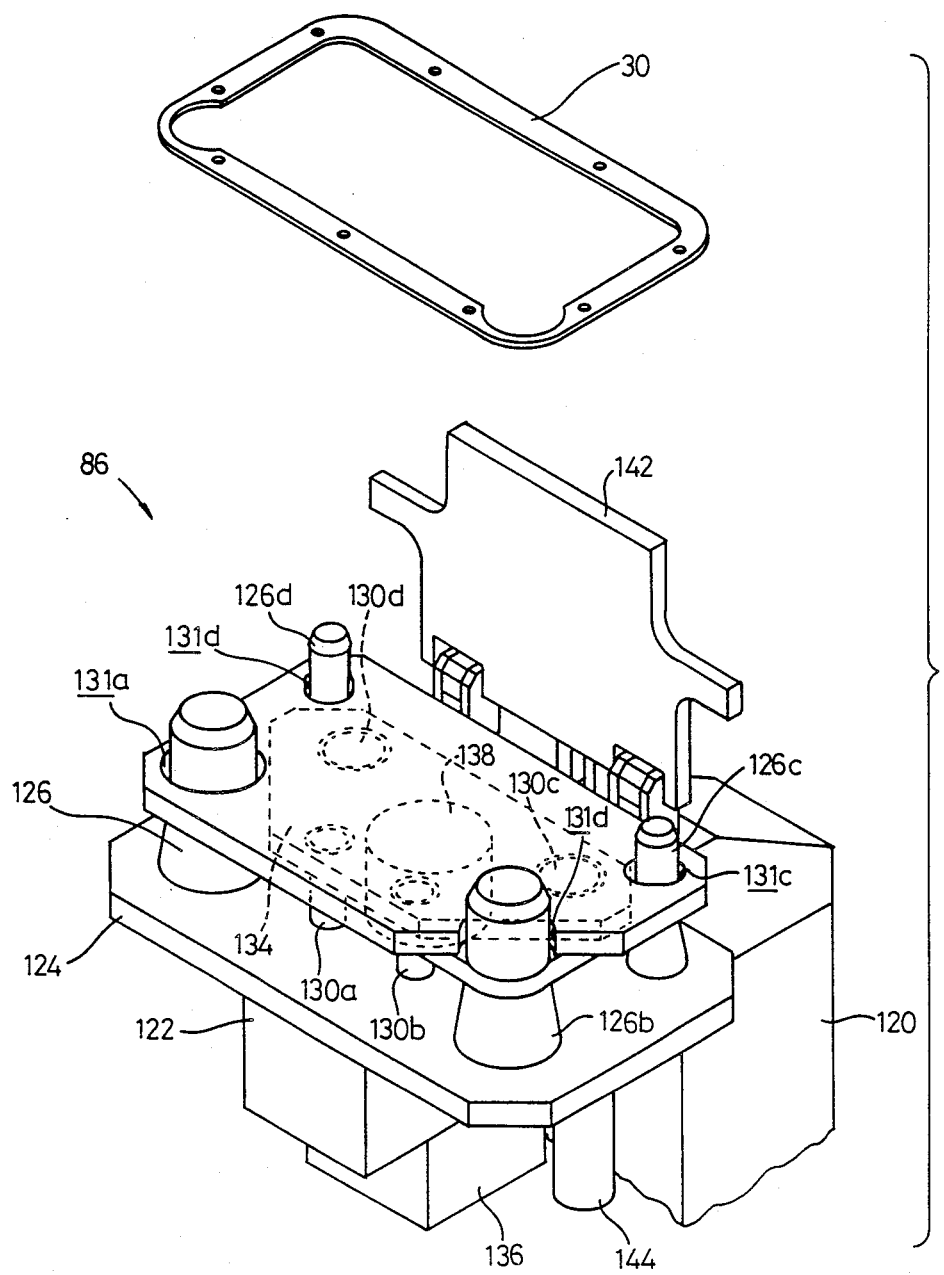
FIG. 7 is a perspective view of an aligner unit for correcting the shape of a case gasket.
Figure 8:
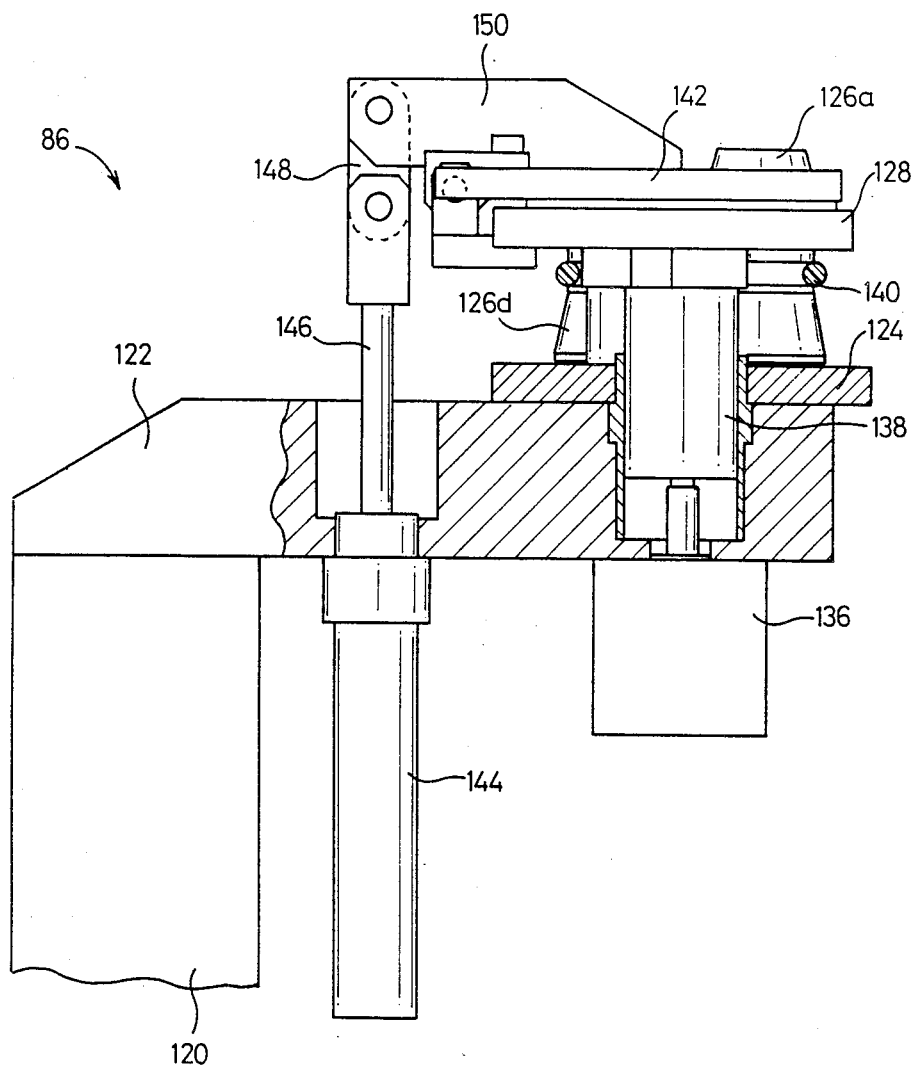
FIG. 8 is a side elevational view, partly in cross section, of the aligner unit.

FIG. 7 shows in perspective the aligner unit 86 for correcting the shape of the case gasket 30. FIG. 8 also shows the aligner unit 86 in side elevation, partly in cross section, and FIG. 9 shows the aligner unit 86 in cross section.

As shown in FIGS. 7 and 8, the aligner unit 86 is mounted on a horizontally extending support beam 122 mounted on the upper distal end of an upstanding frame 120 on the floor. The aligner unit 86 includes a first pate 124 on which four substantially cylindrical gasket tensioning members 126a through 126d are tiltably mounted for contacting the respective inner surfaces of the four corners of a case gasket 30. The gasket tensoning members 126a, 126b are larger in diameter, and the gasket tensioning members 126c, 126d are smaller in diameter. The gasket tensioning members 126a through 126d have tapered surfaces progressively flaring toward their lower proximal ends on the first plate 124. A second plate 128 is supported above the first plate 124 by columns 130a through 130d mounted on the first plate 124. The second plate 128 has holes 131a through 131d defined therein through which the gasket tensioning members 126a through 126d extend with their upper ends projecting upwardly.

Figure 9:
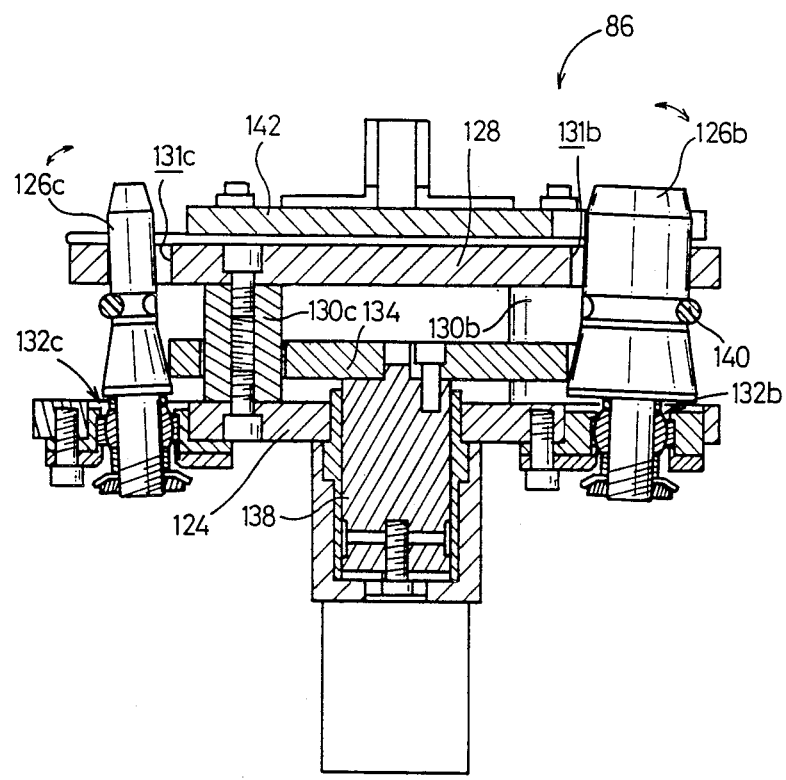
FIG. 9 is a cross-sectional view taken along line IX—IX of FIG. 7.

FIG. 9 clearly shows the manner in which the gasket tensioning members 126a through 126d and the first plate 124 are coupled. The gasket tensioning members 126a through 126d are mounted on the first plate 124 through respective flexible couplings 132a through 132d which allow the gasket tensioning members 126a through 126d to be tilted with respect to the first plate 124 as indicated by the arrows. The holes 131a through 131d through which the respective gasket tensioning members 126a through 126d extend have diameters larger than the outside diameters of the gasket tensioning members 126a through 126d. Between the first and second plates 124, 128, there is disposed a slide plate 134 (clearly shown in FIG. 9) held in sliding contact with tapered side surfaces of the gasket tensioning members 126a through 126d which progressively flare toward the lower ends of the gasket tensioning members 126a through 126d, the side plate 134 serving to tilt the gasket tensioning members 126a through 126d radially outwardly. The slide plate 134 is operatively joined to a drive source or cylinder 138 through a cylindrical coupling 138 for vertical displacement. A resilient ring 140 made of a resilient material such as rubber is disposed around and engages the gasket tensioning members 126a through 126d for normally urging them into pressed engagement with the slide plate 134.

As shown in FIG. 8, a presser plate 142 for pressing a case gasket 30 down against the second plate 128 is swingably, i.e., openably and closably, disposed on one side of the second plate 128. The presser plate 142 can be opened and closed by a cylinder 144 mounted on the support beam 122 and having a piston rod 146 operatively connected through a link 148 to an opening/closing lever 150 joined to the presser plate 142.

Figure 10:
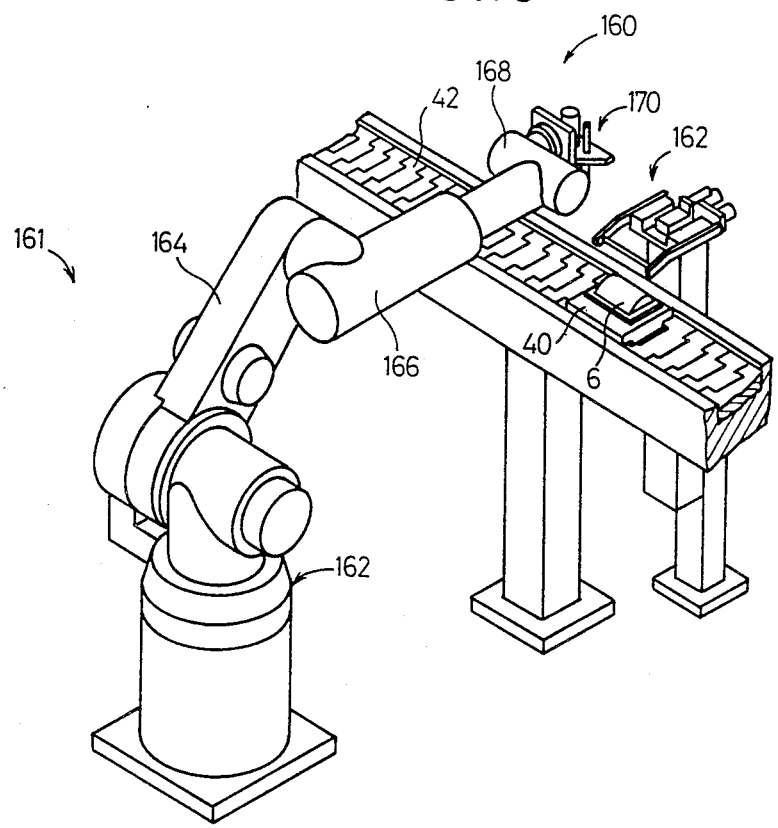
FIG. 10 is a perspective view of a case gasket applicator.

A case gasket applicator 160 (FIG. 10) operates to set, on the handle case 4, a case gasket 30 which has been corrected in shape by the case gasket supply mechanism 80. As shown in FIG. 10, the case gasket applicator 160 comprises a handling robot 161, and an assisting jig 162 for assisting in holding a case gasket 30 when the handling robot 161 sets the case gasket 30 on the handle case 4 on the pallet 40.

While the handling robot 161 may be any of various industrial robots which are currently available for use in production sites, the handling robot 161 in the illustrated embodiment comprises a known industrial robot having six axes with the number of degrees of freedom being 6. The handling robot 161 comprises a swivel base 163, a first arm 164, a second arm 166, and a wrist 168 mounted on the distal end of the second arm 166. By teaching the wrist 168 through a desired path of movement, an end effector or hand mounted on the wrist 168 can be displaced along the desired path.

Figure 11:
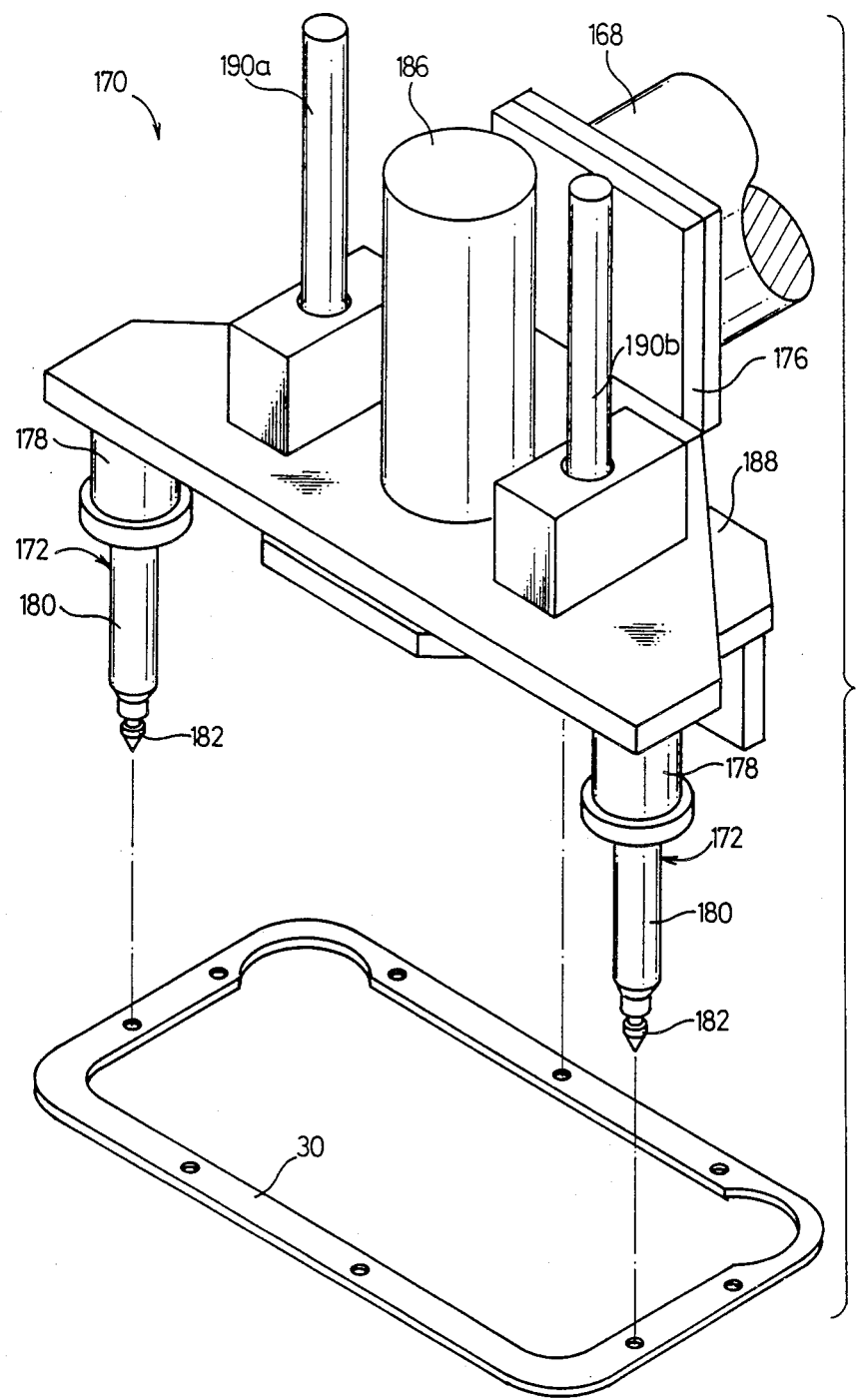
FIG. 11 is a perspective view of an end effector of the handling robot shown in FIG. 10.

FIG. 11 shows an end effector 170 mounted on the wrist 168 of the handling robot 161. The end effector 170 includes three chuck means 172 for holding the corrected case gasket 30 at three points. The chuck means 172 are identical in structure to each other and are each shown in detail in FIG. 12. The case gasket 30 as it is tensioned by the gasket tensioning members 126a through 126d on the aligner unit 86 is held by the chuck means 172. As shown in FIG. 11, the chuck means 172 are positioned in alignment with respective three selected holes in the tensioned case gasket 30 which are symmetrically located.

Figure 12:
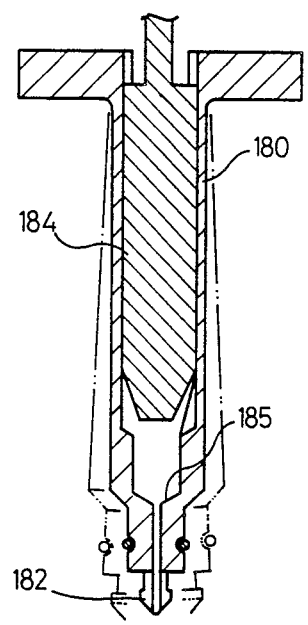
FIG. 12 is a cross-sectional view of a collet chuck in the end effector.
Figure 13:
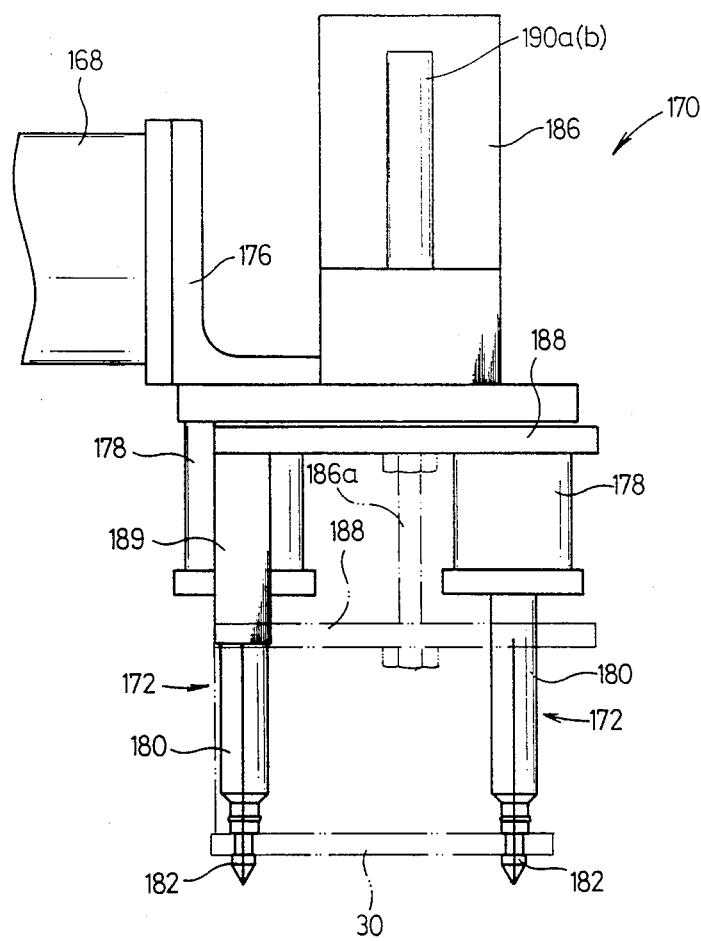
FIG. 13 is a side elevational view of the end effector.

As shown in FIGS. 12 and 13, the chuck means 172 are actuated by respective chuck opening and closing cylinders 178 fixed to the lower surface of a bracket 176 secured to the wrist 168. From the cylinders 178, there depend respective collet chucks 180 having slits extending from cylindrical portions to conical portions 182 on their lower distal ends. As illustrated in FIG. 12, the cylinders 178 have respective pusher rods 184 having tapered lower distal ends, respectively, and inserted respectively in the collet chucks 180. By lowering the pusher rods 184 with the cylinders 178, the lower ends of the pusher rods 184 engage tapered portions 185 of the collet chucks 180 to spread conical portions 182 of the collet chucks 180 radially outwardly.

The end effector 170 is shown in side elevation in FIG. 13. As illustrated in FIG. 13, a cylinder 186 is mounted centrally on the upper surface of the bracket 176 and has a piston rod 186a to which there is fixed a plate 188 with a presser member 189 attached thereto for pressing a case gasket 30. Guide bars 190a, 190b are affixed to the plate 188 for guiding the presser member 189 when it is displaced by the cylinder 186.

The assisting jig 162 is shown in FIGS. 14 and 15. The assisting jig 162 has a mechanism for engaging the clamping members 56a, 56b of the pallet 40 to unclamp the clamping members 56a, 56b, and a mechanism for holding a case gasket 30 to remove the case gasket 30 from the chuck means 172 of the end effector 170 when setting the case gasket 30 on the door handle assembly 2 on the pallet 40.

The assisting jig 162 includes two parallel guide rails 202a, 202b attached to opposite ends of a surface plate 200 mounted on a lifting and lowering means (not shown), and sliders 204a, 204b slidably fitted over the guide rails 202a, 202b and to which a pair of respective arms 206a, 206b is fixed. A clamp release lever 208 for pressing the clamping members 56a, 56b of the pallet 40 for unclamping the clamping members 56a, 56b is secured at its opposite ends to the distal ends of the arms 206a, 206b. The clamp release lever 208 is movable back and forth by a cylinder 209 disposed behind the assisting jig 162 and having a piston rod 210 coupled to the slider 204a through a joint.

A guide plate 212 is disposed on the surface plate 200 between the guide rails 202a, 202b. A gasket holding means 216 is movably disposed on the guide plate 212 and displaceable along the guide plate 212 by a cylinder 214. The gasket holding means 216 has a presser member 218 for pressing one end of a case gasket 30 toward the handle case 6 and a cylinder 220 for actuating the presser member 218. The presser member 218 is angularly movably supported by a pin 222 and operatively coupled to a piston rod 226 of the cylinder 220 through a pair of links 224a, 224b.

The gasket supplying and installing apparatus of the present invention is basically constructed as described above. Operation of the gasket supplying and installing apparatus will be described below in relation to a method of supplying and installing a gasket.

As shown in FIGS. 3 and 10, the pallet 40 with the door handle assembly 2 fixedly mounted thereon is delivered by the conveyor 42 into an assembling station which is equipped with the gasket supplying and installing apparatus of the present invention, and is then stopped in position. As can readily be understood from FIG. 3, a pallet camping means (not shown) including a cylinder and other components is disposed alongside of the conveyor 42. The pallet 42 can be positioned in place by holding dog chucks, for example, of the pallet clamping means in the notches 46a, 46b, 47 in the pallet base 44 of the pallet 40. A handle case 4 is fixedly mounted on the pallet 40 by the clamping members 56a, 56b. A handle 6 is fixed in position by the clamping lever 64 as shown in FIG. 4. The handle 6 is substantially assembled on the handle case 4 by these clamping members.

Prior to describing a process of mounting a case gasket 30 on the handle case 4 on the pallet 40, operation of the case gasket supply mechanism 80 for supplying a case gasket 30 to the handling robot 161 will be described.

As shown in FIG. 5, one of case gaskets 30 on one of the magazine racks 88 in the gasket magazine unit 82 is separated and fed, at a time, by the gripping mechanism 102 of the pickup unit 84, as follows:

The cylinder 95 of the pickup unit 84 is actuated to raise the unit body 96 to a predetermined position in which the ball screw 100 is rotated about its own axis by the motor 98 to move the gripping mechanism 102 forwardly (to the right in FIG. 5) with a nut threaded over the ball screw 100. When the gripping mechanism 102, together with the guide bar 102 fitted in the unit body 96, reaches the position indicated by the solid lines in FIG. 5, the rotation of the ball screw 100 is stopped.

In the position shown in FIG. 5, the gripping mechanism 102 contacts a case gasket 30, a portion of which is fitted in the slot 110 in the gripping member 108, as shown in FIG. 6(b). Since the gripping mechanism 102 horizontally approaches the case gasket 30 which depends vertically, the movement of the gripping member 108 to engage the case gasket 30 can be facilitated. Then, the cylinder 118 is operated to turn the lever 114 to cause the separator 116 to separate one case gasket 30 from the other case gaskets 30. The separated case gasket 30 is held between the separator 116 and the gripping member 108. A non-illustrated motor is energized to turn the gripping mechanism 102 through about 270° in the direction of the arrow in FIG. 5 to remove the case gasket 30 from the bars 92a, 92b and to hold the case gasket 30 in a horizontal plane. With the case gasket 30 thus held, the motor 192 is energized to move the gripping mechanism 102 forwardly into the position indicated by the two-dot-and-dash lines in FIG. 5 for thereby setting the case gasket 30 on the aligner unit 86. When the case gasket 30 is to be set on the aligner unit 86, the gripping lever 114 of the gripping mechanism 102 is opened, and at the same time the gripping mechanism 102 itself is slightly lowered with the unit body 96 by the cylinder 95, thus placing the case gasket 30 on the aligner unit 86. After all the case gaskets 30 have been fed from one magazine rack 88, the next magazine rack 88 is moved into a position for coaction with the gripping mechanism 102. The magazine racks 88 are thus successively intermittently moved in a loop for supplying case gaskets 30 uninterruptedly.

The aligner unit 86 corrects the case gasket 30 into a flat shape. The case gasket 30 is corrected in shape since case gaskets 30 may not be uniform in thickness and may be locally deformed for some reasons, and deformed case gaskets 30 might cause troubles. Operation of the aligner unit 86 will readily be understood from FIGS. 8 and 9.

More specifically, the piston rod 146 of the cylinder 144 is extended to turn down the presser plate 142 to press the case gasket 30 against the second plate 128. The case gasket 30 is forcibly sandwiched between the second plate 128 and the presser plate 142. As shown in FIG. 9, the slide plate 134 is lowered by the cylinder 136. Since the slide plate 134 has been held in abutment against the sides of the gasket tensioning members 126a through 126d, the downward movement of the slide plate 134 causes the gasket tensioning members 126a through 126d, which engage the four corners of the case gasket 30, to be tilted radially outwardly because the slide plate 134 slidably engages the downwardly flaring tapered surfaces of the gasket tensioning members 126a through 126d. Therefore, the case gasket 30 is radially outwardly tensioned forcibly into a flat configuration. Then, the presser plate 142 is lifted to allow the corrected case gasket 30 to be fed to a next process. At this time, the case gasket 30 remains tensioned by the gasket tensioning members 126a through 126d, and the tensioned case gasket 30 is gripped by the handling robot 161.

FIG. 11 shows the manner in which the case gasket 30 on the aligner unit 86 is held by the end effector 170 mounted on the wrist 168 of the handling robot 161. More specifically, the handling robot 161 is moved along a learned path to enable the end effector 170 to approach the case gasket 30 on the aligner unit 86 along a predetermined path. The distal conical portions 182 of the collet chucks 180 of the three chuck means 172 on the end effector 170 are inserted into the respective holes of the case gasket 30 as shown in FIG. 11. The chuck opening and closing cylinders 178 are then actuated to open the collet chucks 180, whereby the case gasket 30 is held at three points while being tensioned radially outwardly. Therefore, the case gasket 30 is prevented from being distorted or deformed when it is mounted on the handle case 4.

In FIG. 10, the handling robot 161 installs the case gasket 30 on the handle case 4 on the pallet 40 which is held at rest in the assembling station. At this time, the assisting jig 162 for assisting the handling robot 161 in installing the case gasket 30 operates in the manner described below with reference to FIG. 15.

The assisting jig 162 which is disposed on a lifting and lowering means (not shown) is initially held such that the arms 206a, 206b supporting the clamp release lever 208 are in an elevated position represented by the two-dot-and-dash lines in FIG. 15. The lifting and lowering means is then operated to lower the assisting jig 162 until the clamp release lever 208 reaches a position at the same height as that of the lower ends of the clamping members 56a, 56b of the pallet 40, whereupon the downward movement of the assisting jig 162 is stopped. Thereafter, the cylinder 209 is operated to retract the arms 206a, 206b toward the assisting jig 162 for bringing the clamp release lever 208 between the arms 206a, 206b into engagement with the clamping members 56a, 56b and turning the clamping members 56a, 56b away from the handle case 4. The clamping members 56a, 56b are disengaged from the handle case 4 because if the clamping members 56a, 56b remained in engagement with the peripheral flange surface of the handle case 4, the clamp members 56a, 56b would be in the way when setting the case gasket 30 on the handle case 4, as can also be understood from FIG. 3.

Then, the handling robot 161 places the case gasket 30 held by the end effector 170 on the handle case 4 on the pallet 40. At this time, in order to reliably separate the case gasket 30 from the collet chucks 180 of the end effector 170, the presser member 189 of the end effector 170 is lowered by the cylinder 186 as soon as the case gasket 30 is positioned slightly above the handle case 4. Now, the case gasket 30 is pressed against the handle case 4 (see FIG. 13). Substantially concurrent with this, the assisting jig 162 operates as follows:

The gasket holding means 216 of the assisting jig 162 is moved forwardly to a predetermined position by the cylinder 214. The presser member 218 of the gasket holding means 216 is turned about the pin 222 by the cylinder 220 to hold the portion of the case gasket 30 which is opposite to the portion thereof that is pressed by the presser member 189 of the end effector 170. Thus, the case gasket 30 is reliably disengaged from the collet chucks 180 and the protrusions 32 on the handle case 4 are fitted respectively in the small holes in the case gasket 30. The mounting of the case gasket 30 on the handle case 4 is now completed.

After the case gasket 30 has been set on the handle case 4, the protrusions 32 are deformed by staking in the next assembling station to fix the case gasket 30 to the handle case 4. The above operation is successively effected fully automatically to install case gaskets 30 on respective door handle assemblies 2 which are successively conveyed on respective pallets 40 on the conveyor 42.

With the present invention, as described above, all processing steps ranging from the supply of a gasket to the installation of the gasket are fully automated, and a gasket which is of a soft material is automatically corrected in shape. Therefore, a gasket can reliably be installed on a handle case automatically with increased efficiency.

Although a certain preferred embodiment has been shown and described, it should be understood that many changes and modifications may be made therein without departing from the scope of the appended claims.

What is claimed is:

1. A method of installing a gasket on a flange of a handle case of a door handle to be attached to an outer surface of an automotive door panel in an automatically assembling process of the door handle, wherein an installed gasket has a final shape conforming to the shape of the flange of the handle case, said method comprising the steps of:

separating one gasket at a time from a vertically suspended stack of gaskets, said separated gasket having a predetermined shape;

correcting said predetermined shape of the separated gasket by tensioning and pressing said separated gasket to said final shape, said final shape of the separated gasket conforming to said shape of the flange of the handle case; and thereafter mounting said gasket on the flange of said handle case while tensioning the gasket.

2. The method according to claim 1, wherein said gasket is substantially rectangular in shape.

3. The method according to claim 1, further including the step of delivering said vertically suspended stack of gaskets along a loop to a feeding means for separating gaskets one by one from the stack of gaskets.

4. The method according to claim 1, wherein the step of tensioning includes tensioning said separated gasket radially outwardly while vertically pressing the separated gasket across its plane.

5. The method according to claim 1 or 2, wherein the step of tensioning includes tensioning said separated gasket in engagement with an inner surfaces of four corners of the separated gasket while vertically pressing the separated gasket across its plane.

6. The method according to claim 1, wherein the step of mounting said separated gasket on said flange includes holding the separated gasket in engagement with protrusions on the flange of the handle case.

* * * * *